(12) United States Patent
Lu

(10) Patent No.: US 9,977,531 B2
(45) Date of Patent: May 22, 2018

(54) OPTICAL TOUCH APPARATUS, A METHOD FOR DETERMINING A POSITION OF A TOUCH INDICATOR POINT AND AN OPTICAL TOUCH SYSTEM

(71) Applicant: Wistron Corporation, New Taipei (TW)

(72) Inventor: Kuo-Hsien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 197 days.

(21) Appl. No.: 15/058,150

(22) Filed: Mar. 2, 2016

(65) Prior Publication Data

US 2017/0212627 A1 Jul. 27, 2017

(30) Foreign Application Priority Data

Jan. 21, 2016 (TW) .............................. 105101809 A

(51) Int. Cl.
*G06F 3/042* (2006.01)
*G06F 3/0354* (2013.01)
(Continued)

(52) U.S. Cl.
CPC .......... *G06F 3/0416* (2013.01); *G06F 3/0386* (2013.01); *G06F 3/03542* (2013.01); *G06F 3/042* (2013.01); *G06F 3/0421* (2013.01)

(58) Field of Classification Search
CPC .. G06F 3/0416; G06F 3/03542; G06F 3/0421; G06F 3/0386
See application file for complete search history.

(56) References Cited

U.S. PATENT DOCUMENTS

2005/0030287 A1* 2/2005 Sato .................... G06F 3/03545
345/158
2007/0290995 A1* 12/2007 Ting ..................... G06F 3/0386
345/157
(Continued)

FOREIGN PATENT DOCUMENTS

TW 201128486 8/2011
TW 201541315 11/2015

OTHER PUBLICATIONS

"Office Action of Taiwan Counterpart Application" with English translation thereof, dated Oct. 21, 2016, p. 1-p. 13, in which the listed reference was/references were cited.

*Primary Examiner* — Ibrahim A Khan
(74) *Attorney, Agent, or Firm* — JCIPRNET

(57) ABSTRACT

An optical touch apparatus configured to sense a touch operation of an optical touch stylus is provided. The optical touch apparatus includes a touch operation surface, an optical sensor and a touch controller. The optical touch stylus performs the touch operation on the touch operation surface. The optical sensor is disposed on a side of the touch operation surface and senses the light beam from the touch operation to obtain sensing data. The sensing data include an image of the optical touch stylus and a mirror image generated on the touch operation surface by the optical touch stylus. The touch controller is electrically connected to the optical sensor and calculates a brightness threshold according to the sensing data. The touch controller determines a position of the touch indicator point of the optical touch stylus on the touch operation surface according to the sensing data and the brightness threshold.

12 Claims, 7 Drawing Sheets

(51) Int. Cl.
G06F 3/041 (2006.01)
G06F 3/038 (2013.01)

(56) References Cited

U.S. PATENT DOCUMENTS

| | | | |
|---|---|---|---|
| 2010/0051356 A1* | 3/2010 | Stern | G06F 3/03545 178/19.04 |
| 2011/0069029 A1* | 3/2011 | Ryu | G06F 3/0416 345/173 |
| 2011/0187679 A1* | 8/2011 | Ko | G06F 3/042 345/175 |
| 2011/0199340 A1* | 8/2011 | Aikio | G02B 6/0021 345/175 |
| 2012/0013529 A1* | 1/2012 | McGibney | G06F 3/0425 345/156 |
| 2012/0262423 A1* | 10/2012 | Su | G06F 3/0416 345/175 |
| 2015/0212652 A1* | 7/2015 | Lin | G06F 3/0421 345/175 |
| 2015/0309647 A1 | 10/2015 | Lu et al. | |
| 2017/0147142 A1* | 5/2017 | Gu | G06F 3/0488 |

* cited by examiner

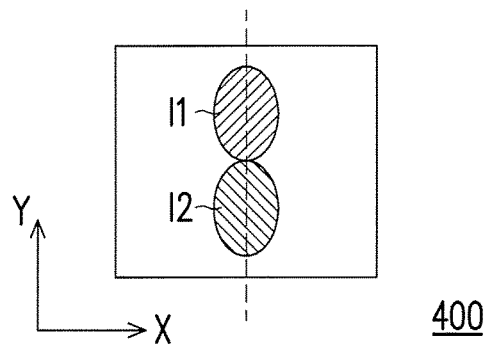
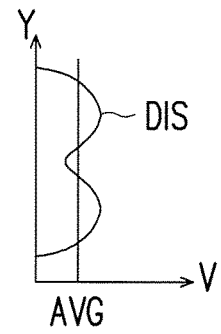
FIG. 4    FIG. 6
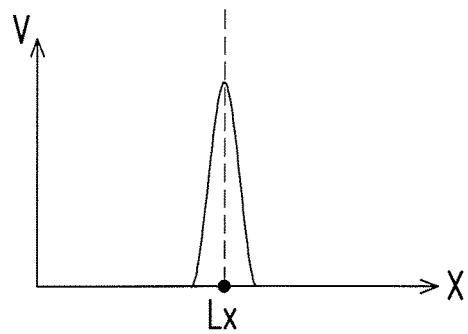
FIG. 5
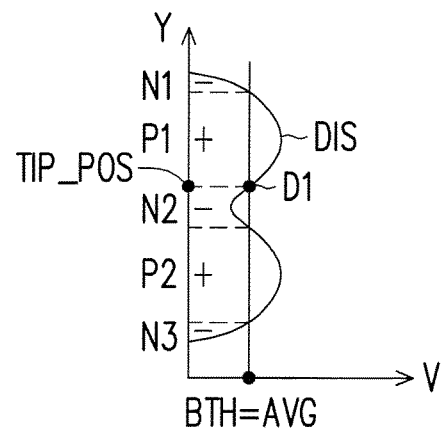
FIG. 7

OPTICAL TOUCH APPARATUS, A METHOD FOR DETERMINING A POSITION OF A TOUCH INDICATOR POINT AND AN OPTICAL TOUCH SYSTEM

CROSS-REFERENCE TO RELATED APPLICATION

This application claims the priority benefit of Taiwan application serial no. 105101809, filed on Jan. 21, 2016. The entirety of the above-mentioned patent application is hereby incorporated by reference herein and made a part of this specification.

BACKGROUND OF THE INVENTION

1. Field of the Invention

The invention relates to a touch apparatus, a method for determining a position, and a touch system, and particularly relates to an optical touch apparatus, a method for determining a position of a touch indicator point, and an optical touch system.

2. Description of Related Art

Generally, optical touch systems can be classified into two types, namely a blocking type and a non-blocking type. A blocking optical touch system is based on the principle of signal blocking that a touch object blocks a light signal emitted from a light source (e.g., a string of light emitting diodes or a reflective strip), and optical sensors in the blocking optical touch system sense a shadow having a lower brightness relative to the background of the touch object, such that an occurring position of the touch object and its corresponding touch operation can be determined. On the other hand, a non-blocking optical touch system usually includes an optical touch stylus or the use of a finger which is configured to perform a touch operation on a touch surface so as to transmit a light signal to the optical sensors. For example, in the non-blocking optical touch system using the optical touch stylus, according to the type of the optical touch stylus, the light signal transmitted from the optical touch stylus to the optical sensors may be actively generated from the internal of the optical touch stylus, or generated by the optical touch stylus reflecting back the light signal transmitted by a light source attached to the optical sensor. Therefore, the optical sensors can determine the occurring position of the touch object and its corresponding touch operation according to the received light signal having a higher brightness relative to the background.

However, the optical touch stylus may generate a mirror image on the touch surface (e.g., when the touch surface is a white board) when the optical touch stylus is operated on the touch surface. Since the properties of the mirror image may differ as factors such as the material of the touch surface and the positions of the optical sensors relative to the optical touch stylus differ, the optical sensors may not be able to accurately determine the position of the tip of the optical touch stylus or the touch indicator point after receiving an optical signal, making the touch system less convenient to use. For example, when the determined position of the tip of the stylus is too low, a touch response is generated when there is still a certain distance between the optical touch stylus and the touch surface, and when the determined position of the tip of the stylus is too high, the connection of the optical touch stylus on the touch surface may be disconnected.

SUMMARY OF THE INVENTION

The invention provides an optical touch apparatus, a method for determining a position of a touch indicator point, and an optical touch system capable of sensing a touch operation of an optical touch stylus and calculating the position of the touch indicator point.

An optical touch apparatus according to an embodiment of the invention is adapted to sense a touch operation of an optical touch stylus capable of reflecting or emitting a light beam. The optical touch apparatus includes a touch operation surface, an optical sensor, and a touch controller. The optical touch stylus performs the touch operation on the touch operation surface. The optical sensor is disposed at a side of the touch operation surface and adapted to sense the light beam from the touch operation to obtain sensing data. The touch controller is electrically connected to the optical sensor and adapted to calculate a brightness threshold based on the sensing data, and determines a position of a touch indicator point of the optical touch stylus on the touch operation surface based on the sensing data and the brightness threshold. The sensing data include an image of the optical touch stylus and a mirror image generated by the optical touch stylus on the touch operation surface.

A method for determining a position of a touch indicator point according to an embodiment of the invention is adapted to determine a position of a touch indicator point of an optical touch stylus capable of emitting or reflecting a light beam when the optical touch stylus performs a touch operation on a touch operation surface. The method for determining the position of the touch indicator point includes steps as follows. The light beam is sensed from the touch operation by using an optical sensor, so as to obtain sensing data. A brightness threshold is calculated based on the sensing data. The position of the touch indicator point of the optical touch stylus on the touch operation surface is determined based on the sensing data and the brightness threshold. The sensing data include an image of the optical touch stylus and a mirror image generated by the optical touch stylus on the touch operation surface.

An optical touch system 10 according to an embodiment of the invention includes an optical touch stylus and an optical touch apparatus. The optical touch stylus is adapted to perform a touch operation and capable of emitting or reflecting a light beam. The optical touch apparatus includes a touch operation surface, an optical sensor, and a touch controller. The optical touch stylus performs the touch operation on the touch operation surface. The optical sensor is disposed at a side of the touch operation surface and adapted to sense the light beam from the touch operation to obtain sensing data. The touch controller is electrically connected to the optical sensor and adapted to calculate a brightness threshold based on the sensing data, and determines a position of a touch indicator point of the optical touch stylus on the touch operation surface based on the sensing data and the brightness threshold. The sensing data include an image of the optical touch stylus and a mirror image generated by the optical touch stylus on the touch operation surface.

Based on the above, in the exemplary embodiments of the invention, the touch controller distinguish a reflection image of the optical touch stylus and a mirror image generated by the optical touch stylus on the touch operation surface in the sensing data based on the brightness threshold of the sensing data, so as to calculate the position of the touch indicator point. Such design is capable of increasing the accuracy in determining the position of the touch indicator position of the optical touch stylus on the touch operation surface.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic view illustrating sensing data according to an embodiment of the invention.

FIG. 5 is a schematic view illustrating a touch positioning point according to an embodiment of the invention.

FIG. 6 is a schematic view illustrating a brightness distribution according to an embodiment of the invention.

FIG. 7 is a schematic view illustrating the method for determining the position of the touch indicator point according to the embodiment of FIG. 3.

DESCRIPTION OF THE EMBODIMENTS

Figure 1A:
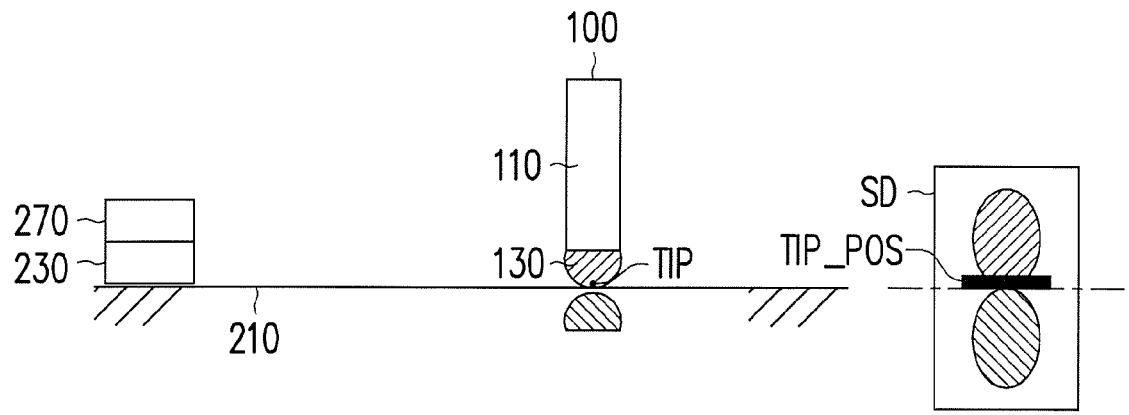
FIG. 1A is a schematic side view illustrating an optical touch system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Several embodiments are provided below to describe the invention. However, the invention should not be limited to the embodiments given herein. The embodiments described below can be combined with each other if deemed proper. The term "coupling/coupled" used in this specification (including claims) may refer to any direct or indirect connection means. For instance, in the description and claims, if a first apparatus is coupled to a second apparatus, it means that the first apparatus may be directly connected to the second apparatus or may be indirectly connected to the second apparatus through another apparatus or by another connection means. In addition, the term "signal" may stand for at least one current, voltage, electric charge, temperature, data, electromagnetic wave, or any other signal or signals.

Figure 1B:
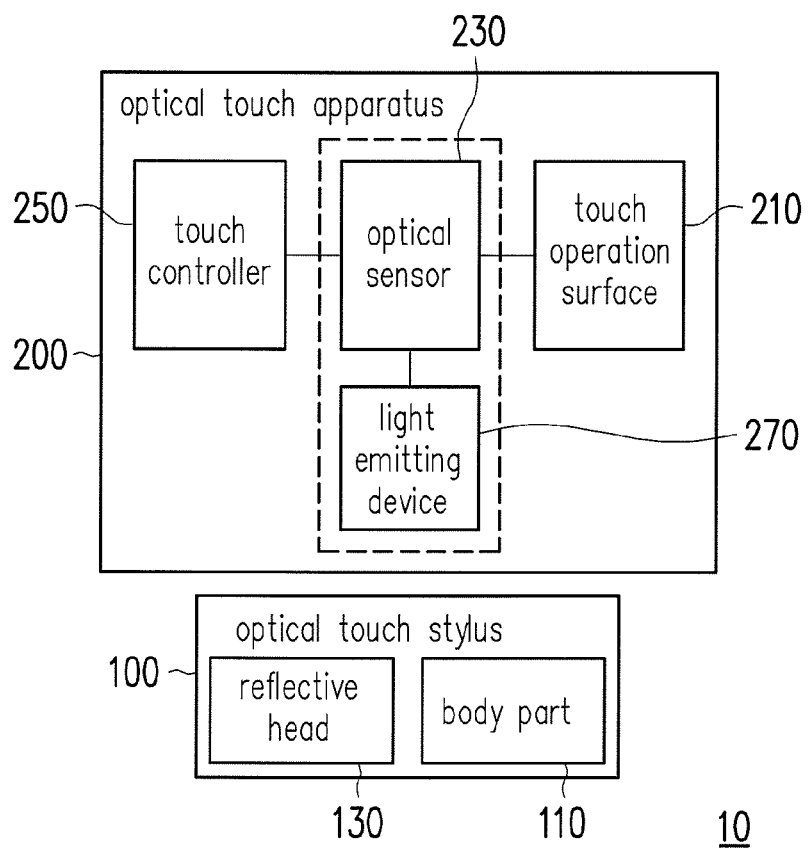
FIG. 1B is a schematic block view illustrating an optical touch system according to an embodiment of the invention.
Figure 2:
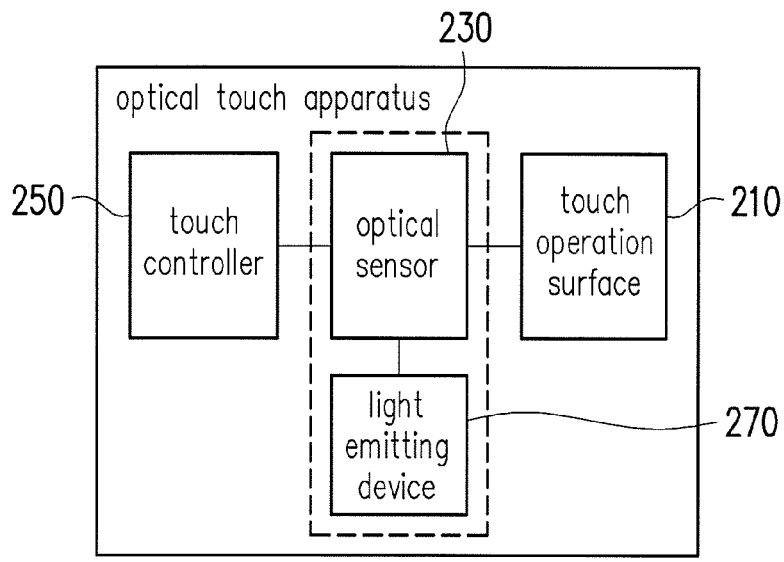
FIG. 2 is a schematic block view illustrating an optical touch apparatus according to an embodiment of the invention.

FIG. 1A is a schematic side view illustrating an optical touch system according to an embodiment of the invention. FIG. 1B is a schematic block view illustrating an optical touch system according to an embodiment of the invention. FIG. 2 is a schematic block view illustrating an optical touch apparatus according to an embodiment of the invention. Referring to FIGS. 1A, 1B, and 2, an optical touch system 10 of this embodiment includes an optical touch stylus 100 and an optical touch apparatus 200. In this embodiment, the optical touch apparatus 200 includes a touch operation surface 210, an optical sensor 230, a touch controller 250, and a light emitting device 270. The touch operation surface 210 is a front surface of a framed or frameless flat-panel display, for example. However, the invention is not limited thereto. The touch operation surface 210 may also be a surface of an apparatus capable of displaying or projecting information, such as television, advertisement billboard, electronic whiteboard, etc. The optical touch stylus 100 is adapted to perform a touch operation on the touch operation surface 210. In this embodiment, as shown in FIGS. 1A and 1B, the optical touch sensor 230 and the light emitting device 270 are combined as a module in the actual practice. In addition, a pair of the optical sensors 230 and the light emitting devices 270 are configured at the upper left corner and the upper right corner of the touch operation surface 210 respectively. However, the invention does not intend to limit the number and positions of the optical touch sensor 230 and the light emitting device 270. In other embodiments, the optical sensor 230 and the light emitting device 270 may also be implemented as individual components adjacent to each other, such as the configuration shown in an optical touch apparatus 200 in FIG. 2, and a pair of the optical sensors 230 and the light emitting devices 270 may also be disposed at two adjacent corners of the touch operation surface. However, it should be understood that the invention does not intend to limit the number and the positions of the optical touch sensor 230 and the light emitting device 270. The optical sensor 230 is adapted to sense a light beam from a touch operation to obtain sensing data. The light emitting device 270 is adapted to emit a light beam and used as a light source of the touch operation surface. In this embodiment, the sensing data obtained by the optical sensor 230 includes a reflection image of the optical touch stylus 100 and a mirror image of the optical touch stylus 100 that may be inevitably generated on the touch operation surface 210. The touch controller 250 is adapted to calculate a brightness threshold based on a brightness value of the image in the sensing data and distinguish the reflection image and the mirror image based on the sensing data and the calculated brightness threshold, so as to determine a position of a touch indicator point of the optical touch stylus 100 on the touch operation surface.

Specifically, in this embodiment, the optical touch stylus 100 is a reflective touch stylus, and the optical touch stylus 100 includes a body part 110 and a reflective head 130. The reflective head 130 includes a reflective layer. The reflective layer includes an optical retro-reflection material adapted to reflect the light beam emitted by the light emitting device 270 back to the optical sensor 230. In this embodiment, as shown in FIG. 1A, a touch indicator point TIP of the optical touch stylus 100 is located at a tip position at a top end of the reflective head 130, and the optical sensor 230 may sense the light beam reflected by the optical touch stylus 100 when the optical touch stylus 100 performs a touch operation on the touch operation surface 210 and obtain sensing data SD. In addition to the image reflected by the reflective head 130, the sensing data SD may further include the mirror image generated by the reflective head 130 on the touch operation surface 210. The touch controller 250 may calculate the brightness threshold based on the sensing data SD, and determine a position TIP_POS of the touch indicator point of the optical touch stylus 100 on the touch operation surface 210 based on the calculated brightness threshold.

It should be noted that, in other embodiments, the optical touch stylus 100 may also be an active touch stylus. The active touch stylus as the optical touch stylus 100 includes a body part and a driving tip part (including a light emitting diode therein, for example) capable of directly emitting a light beam. Thus, the optical touch apparatus 200 may not include the light emitting device 270. The optical sensor 230 senses the light beam emitted by the optical touch stylus 100 when the optical touch stylus 100 performs the touch operation and obtains the sensing data SD. The sensing data SD so obtained includes the light beam emitted by the driving tip part and the mirror image generated by the driving tip on the touch operation surface 210. In other words, the invention does not intend to impose a limitation on the type of the optical touch stylus 100, and the optical touch stylus 100 may be a reflective touch stylus or an active touch stylus. In addition, sufficient teaching, suggestions, and descriptions for implementation in connection with the operation method of the optical touch stylus 100 of this embodiment may be obtained from the common knowledge in this technical field. Thus, details in this respect will not be repeated in the following. A plurality of embodiments are provided in the following to describe in detail a method that the optical touch apparatus 200 according to the embodiments of the invention determines the position TIP_POS of the touch indicator point of the optical touch stylus 100 by using the obtained sensing data SD when the optical touch stylus 100 performs a touch operation on the touch operation surface 210.

Figure 3:
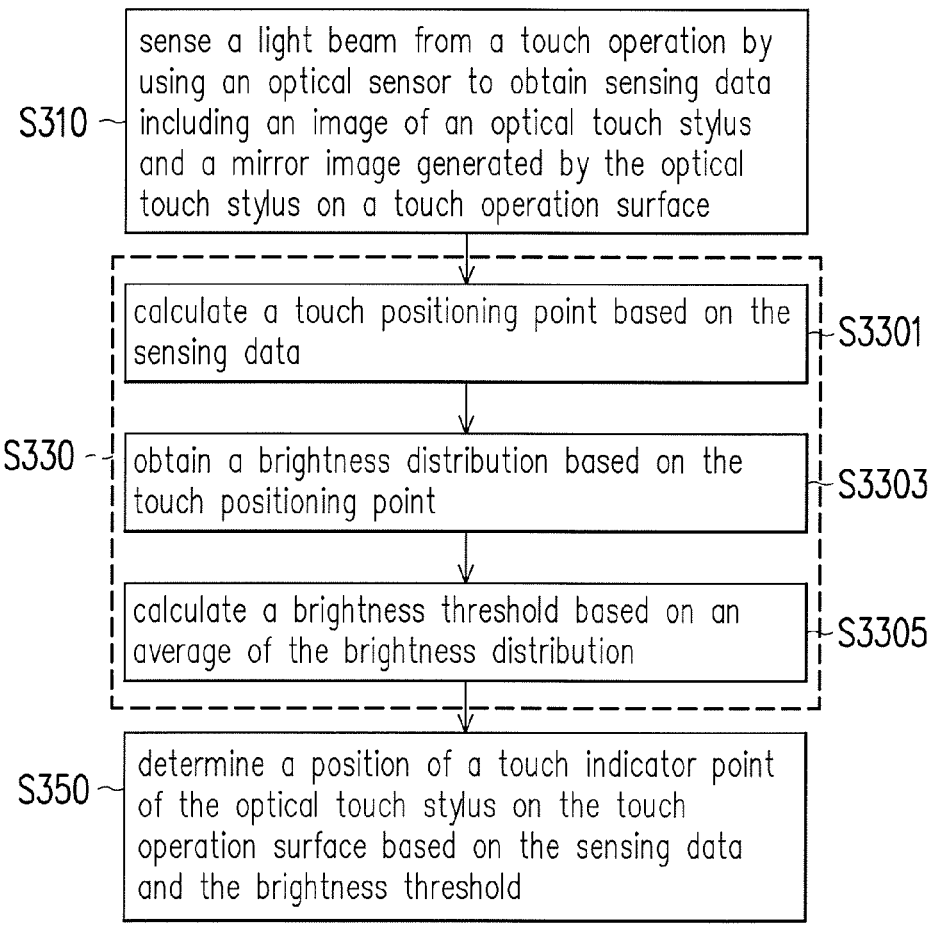
FIG. 3 is a flowchart illustrating a method for determining a position of a touch indicator point according to an embodiment of the invention.

FIG. 3 is a flowchart illustrating a method for determining a position of a touch indicator point according to an embodiment of the invention. Referring to FIG. 3, the optical touch stylus 100 performs a touch operation on the touch operation surface 210 of the optical touch apparatus 200. At Step S310, the touch controller 250 may use the optical sensor 230 to sense the light beam reflected or emitted by the optical touch stylus 100 from the touch operation to obtain the sensing data SD. In this embodiment, the sensing data SD are sensing data 400, for example. The sensing data 400 include a plurality of data points, and each data point includes a first direction (e.g., X direction) coordinate value, a second direction (e.g. Y direction) coordinate value, and a brightness value. FIG. 4 is a schematic view illustrating the sensing data 400 illustrated in accordance with the respective data points. The sensing data 400 include a direct image I1 of the optical touch stylus 100 and a mirror image I2 generated by the optical touch stylus 100 on the touch operation surface 210. It should be noted that the sensing data 400 shown in FIG. 4 include the elliptical images I1 and I2. However, the elliptical images I1 and I2 merely serve as schematic views illustrating the embodiments of the invention and shall not construed as limitations on the invention. In other embodiments, properties such as shape and appearance of the image illustrated based on the sensing data 400 may differ as the materials of the optical touch stylus 100 and the touch operation surface 210 as well as relative positions between the optical touch stylus 100 and the optical sensor 230 or relative operation angles between the optical touch stylus 100 and the optical operation surface 210 differ. In addition, the direct image I1 of the optical touch stylus 100 is not necessarily symmetrical to the mirror image I2 generated by the optical touch stylus 100 on the touch operation surface 210. Namely, the lengths, widths and shapes of the direct image I1 and the mirror image I2 are not necessarily the same.

FIG. 5 is a schematic view illustrating a touch positioning point according to an embodiment of the invention. FIG. 6 is a schematic view illustrating a brightness distribution according to an embodiment of the invention. In this embodiment, after the optical sensor 230 obtains the sensing data 400, at Step S330, the touch controller 250 may calculate the brightness threshold based on the sensing data 400 obtained by the optical sensor 230. More specifically, Step S330 includes Steps S3301 to S3305. First of all, at Step S3301, the touch controller 250 calculates a touch positioning point based on the sensing data 400. In this embodiment, as shown in FIG. 5, the touch controller 250 may adopt the first direction (e.g. X direction) coordinate as the reference and add up the brightness values of the respective data points having the same first direction coordinate value in the sensing data 400. In addition, the touch controller 250 may take the corresponding first direction coordinate value with the greatest total of the brightness values as a touch positioning point Lx. Here, a V-axis represents the size of the brightness value. Then, at Step S3303, based on the touch positioning point Lx, the touch controller 250 obtains a brightness distribution according to the sensing data 400. In this embodiment, the touch controller 250 may use all the data points whose first direction coordinate value is Lx in the sensing data 400 as target data points, and then uses the second direction coordinate values (e.g., Y coordinate values) and the brightness values of the target data points to illustrate a brightness distribution DIS representing the target data points, as shown in FIG. 6. Here, the V-axis represents the size of the brightness value. For the ease of illustration, in the following descriptions, a direction along which the second direction coordinate value becomes greater is represented as the "upward" direction, and a direction along which the second direction coordinate value becomes smaller is represented as the "downward" direction. In addition, the Y coordinate value represents the second direction coordinate value. Then, at Step S3305, the touch controller 250 calculates the brightness threshold based on an average of the brightness distribution DIS. For example, in this embodiment, the touch controller 250 may calculate an average AVG of the brightness values of all the target data points and use the average AVG as a brightness threshold BTH.

FIG. 7 is a schematic view illustrating the method for determining the position of the touch indicator point according to the embodiment of FIG. 3. After the touch controller 250 calculates the brightness threshold BTH, at Step S350, the touch controller 250 may determine the position TIP_POS of the touch indicator point of the optical touch stylus 100 on the touch operation surface 210 based on the sensing data 400 and the brightness threshold BTH. In this embodiment, as shown in FIG. 7, the touch controller 250 may calculate a difference between the brightness distribution DIS and the brightness threshold BTH, so as to divide a second direction coordinate (Y coordinate) plane into a positive difference region and a negative difference region. The brightness value of the target data point whose Y coordinate value is in the positive difference region is greater than the brightness threshold BTH, whereas the brightness value of the target data point whose Y coordinate value is in the negative difference region is not greater than the brightness threshold value. Then, in this embodiment, the touch controller 250 may search downward for a first crossing point between the brightness distribution DIS and the brightness threshold BTH as a first terminal point D1 from a first positive difference region P1 having the largest (uppermost) Y coordinate value in the positive difference region, and determines that the Y coordinate value of the first terminal point D1 is the position TIP_POS of the touch indicator point.

For example, the touch controller 250 may choose a second negative difference region N2 adjacent to and below the first positive difference region P1, take the target data point whose Y coordinate value is uppermost in the second negative difference region N2 as the first terminal point D1, and use the Y coordinate value of the first terminal point D1 as the position TIP_POS of the touch indicator point.

In another example, the touch controller 250 may take a middle point in a connected line between the target data point whose Y coordinate value is located uppermost in the second negative difference region N2 and the target data point whose Y coordinate value is located lowermost in the first positive difference region P1 as the first terminal point D1, and take the Y coordinate value of the first terminal point D1 as the position TIP_POS of the touch indicator point.

In other words, the invention does not intend to impose a limitation on how the crossing point between the brightness distribution DIS and the brightness threshold BTH is determined. More specifically, the brightness distribution DIS shown in FIG. 7 represents the target data points, and a curve of the brightness distribution DIS may be considered as being formed by the target data points. In other words, the crossing point between the brightness distribution DIS and the brightness threshold BTH is merely conceptual. In practice, the first terminal point D1 does not need to be included in the target data points. People having ordinary skills in the art may refer to the descriptions and define the way of determining the crossing point in practice based on the needs.

In the embodiment, the touch controller 250 uses the average AVG of the brightness values of the target data points in the sensing data 400 as the brightness threshold BTH. In other embodiments, the touch controller 250 may further adjust the brightness threshold BTH based on the average AVG, so as to further improve the accuracy of determination.

Figure 8:
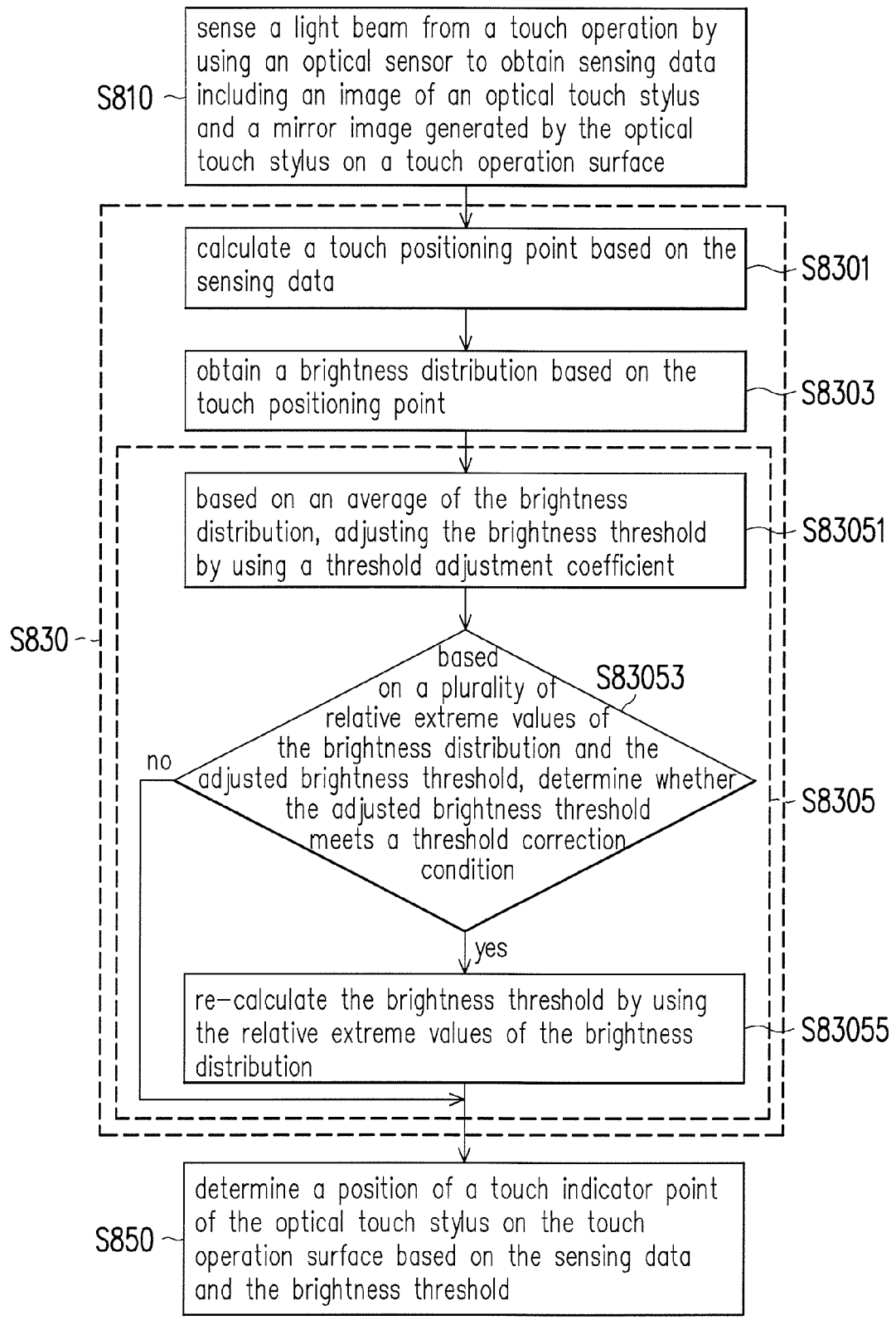
FIG. 8 is a flowchart illustrating a method for determining a position of a touch indicator point according to another embodiment of the invention.
Figure 9A:
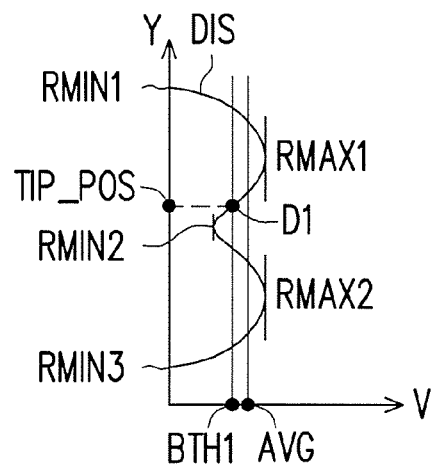
FIGS. 9A to 9C are schematic views illustrating the method for determining the position of the touch indicator point according to the embodiment of FIG. 8.
Figure 9B:
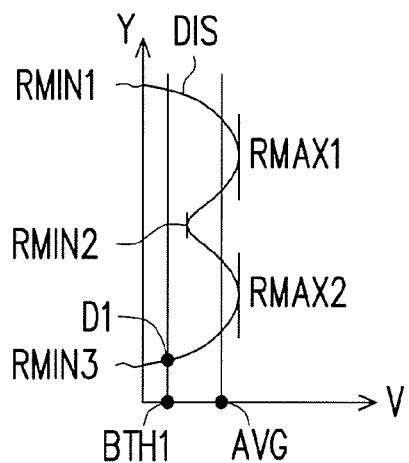
Figure 9C:
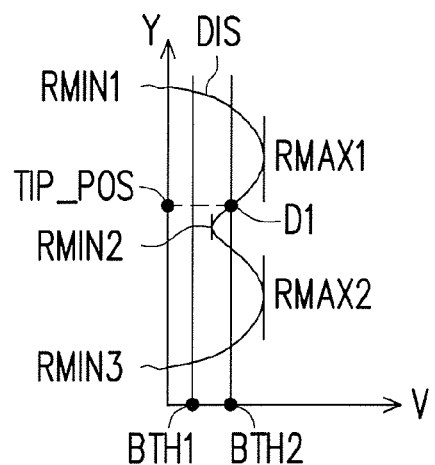

FIG. 8 is a flowchart illustrating a method for determining a position of a touch indicator point according to another embodiment of the invention. FIGS. 9A to 9C are schematic views illustrating a method for determining a position of a touch indicator point according to another embodiment of the invention. Referring to FIGS. 8 and 9A to 9C, in this embodiment, Steps S810, S830, S8301, S8303, S8305, and S850 are respectively similar to Steps S310, S330, S3301, S3303, S3306, and S350. Thus, details in these respects will not be repeated in the following. The difference between this embodiment and the embodiment shown in FIG. 3 lies in that, at Step S3305, when the touch controller 250 uses the average AVG of the brightness distribution DIS to calculate the brightness threshold, the average AVG of the brightness values of the target data points that is calculated is used as the brightness threshold BTH, for example. However, in this embodiment, when the touch controller 250 uses the average AVG of the brightness distribution DIS to calculate the brightness threshold at Step S8305, the step further includes Steps S83051 to S83055. At Step S83051, the touch controller 250 may adjust the brightness threshold based on the average AVG of the brightness distribution DIS by using a threshold adjustment coefficient. In this embodiment, as shown in FIGS. 9A and 9B, the touch controller 250 may calculate the average AVG of the brightness values of all the target data points and multiply the average AVG by a threshold adjustment coefficient n to obtain a first brightness threshold BTH1. Namely BTH1=n×AVG, wherein 0<n<1.

In this embodiment, the threshold adjustment coefficient n is chosen from a threshold adjustment coefficient table set in the the touch controller 250 when the optical touch apparatus 200 is manufactured. In addition, the threshold adjustment coefficient n is associated with the size of the touch operation surface 210, for example. Besides, the threshold adjustment coefficient n is further changed as the touch positioning point Lx differs. For example, when a size of a diagonal of the touch operation surface 210 is in a range from 46 inches to 55 inches, the threshold adjustment coefficient n may be set in a range from 0.3 to 0.38, differing in accordance with the touch positioning point Lx. When the size of the diagonal of the touch operation surface 210 is in a range from 55 inches from 80 inches, the threshold adjustment coefficient n may be set in a range from 0.5 to 0.7, differing in accordance with the touch positioning point Lx. However, the invention does not intend to limit the way the threshold adjustment coefficient n is set and the setting value of the threshold adjustment coefficient n. In other embodiments, the user may set the desired setting value of the threshold adjustment coefficient n by using the threshold controller 250 based on the requirements on using the optical touch apparatus 200.

Then, at Step S83053, the touch controller 250 determines whether the first brightness threshold BTH1 meets a threshold correction condition based on a plurality of relative extreme values of the brightness distribution DIS and the first brightness threshold BTH1 adjusted by using the threshold adjustment coefficient n. The determination using the threshold correction condition is described in the following. The brightness distribution DIS includes at least one relative maximum value and a plurality of relative minimum values. In this embodiment, as shown in FIGS. 9A and 9B, the brightness distribution DIS includes two relative maximum values RMAX1 and RMAX2 from top to bottom and three relative minimum values RMIN1, RMIN2, and RMIN3 from top to bottom. Firstly, the touch controller 250 finds out the first terminal point D1 based on the sensing data 400 by using the first brightness threshold BTH1 as the brightness threshold. The process is similar to Step S350 in the previous embodiment. Thus, details in this respect will not be repeated in the following. Then, the touch controller 250 determines relative positions between the first terminal D1 and the second relative minimum value RMIN2 from top to bottom. If the first terminal point D1 is located above the relative minimum value RMIN2, it is determined that the first brightness threshold BTH1 does not meet the threshold correction condition. The first brightness threshold BTH1 is thus used as the brightness threshold BTH and the process proceeds to Step S850. Alternatively, if the first terminal point D1 is located below the relative minimum value RMIN2, it is determined that the first brightness threshold BTH1 meets the threshold correction condition, and the process proceeds to Step S83055.

Taking FIG. 9A as an example, at Step S83053, the first terminal point D1 found by the touch controller 250 is located above the relative minimum value RMIN2. Therefore, the touch controller 250 determines that the first brightness threshold BTH1 does not meet the threshold correction condition. Then, the touch controller 250 uses the first brightness threshold BTH1 as the brightness threshold BTH and proceeds to Step S850. Namely, BTH=BTH1=n×

AVG, wherein 0<n<1. Step S850 is similar to Step S350 in the previous embodiment. Thus, details in this regard will not be repeated in the following. In this embodiment, the position TIP_POS of the touch indicator point determined by the touch controller 250 at Step S850 is the Y coordinate value of the first terminal point D1 found by the touch controller 250 at Step S83053. Specifically, in this embodiment, since the threshold adjustment coefficient n is used to adjust the brightness threshold BTH, the position TIP_POS of the touch indicator point that is determined may be located lower than the position of the touch indicator point determined by using the method of the embodiment shown in FIG. 3.

In another embodiment, after the touch controller 250 determines that the first brightness threshold BTH1 does not meet the threshold correction condition at Step S83053, the Y coordinate value of the first terminal D1 that is found may be directly determined as the position TIP_POS of the touch indicator point.

Also, due to the differences in terms of how the threshold adjustment coefficient n is determined or the properties of the sensing data represented by the brightness distribution, the adjusted first brightness threshold BTH1 may possibly meet the threshold correction condition and require re-calculation.

Taking FIG. 9B as an example, at Step S83053, the first terminal point D1 found by the touch controller 250 is located below the relative minimum value RMIN2. Therefore, the touch controller 250 determines that the first brightness threshold BTH1 meets the threshold correction condition and proceeds to Step S83055. At Step S83055, the touch controller 250 may use the relative extreme values of the brightness distribution DIS to re-calculate the brightness threshold. In this embodiment, as shown in FIG. 9C, the brightness distribution DIS includes two relative maximum values RMAX1 and RMAX2 from top to bottom and three relative minimum values RMIN1, RMIN2, and RMIN3 from top to bottom. The touch controller 250 may calculate the total of the uppermost relative maximum value RMAX1 and the second relative minimum value RMIN2 from top to bottom, and multiplies the total by a predetermined parameter x to obtain a second brightness threshold BTH2, wherein 0<x<1. In addition, the second brightness threshold BTH2 may be used as the brightness threshold BTH, and the process proceeds to Step S850. In other words, the re-calculated brightness threshold is BTH=BTH2=x*(RMAX+RMIN2), wherein 0<x<1. In this embodiment, the predetermined parameter x is set in the factory setting of the touch controller 250, and may be set to be equal to the threshold adjustment coefficient n, for example. However, the invention does not intend to impose a limitation in this regard. In other embodiments, the predetermined parameter x may also be set as another value that meets the condition based on the user's needs. Then, at Step S850, the touch controller 250 may determine the position TIP_POS of the touch indicator point of the optical touch stylus 100 on the touch operation surface 210 based on the sensing data 400 and the brightness threshold BTH equal to the second brightness threshold BTH2. The relevant determination method is already described in detail in the previous embodiment, and will not be repeated in the following.

In the embodiment, the touch controller 250 further adjusts the brightness threshold BTH based on the average AVG according to factors such as the relative positions between the optical touch stylus 100 and the optical sensor 230, so as to reduce potential errors in determining the position of the touch indicator point and increase the accuracy of determination. However, in some special embodiments, the optical sensor 230 may have difficulties in distinguishing the direct image I1 of the optical touch stylus 100 and the mirror image I2 generated by the optical touch stylus 100 on the touch operation surface 210 due to brightness saturation or other potential factors, for example. Thus, in another embodiment of the invention, whether the images are difficult to distinguish is determined based on the sensing data 400 and such difficulty is dealt with.

Figure 10:
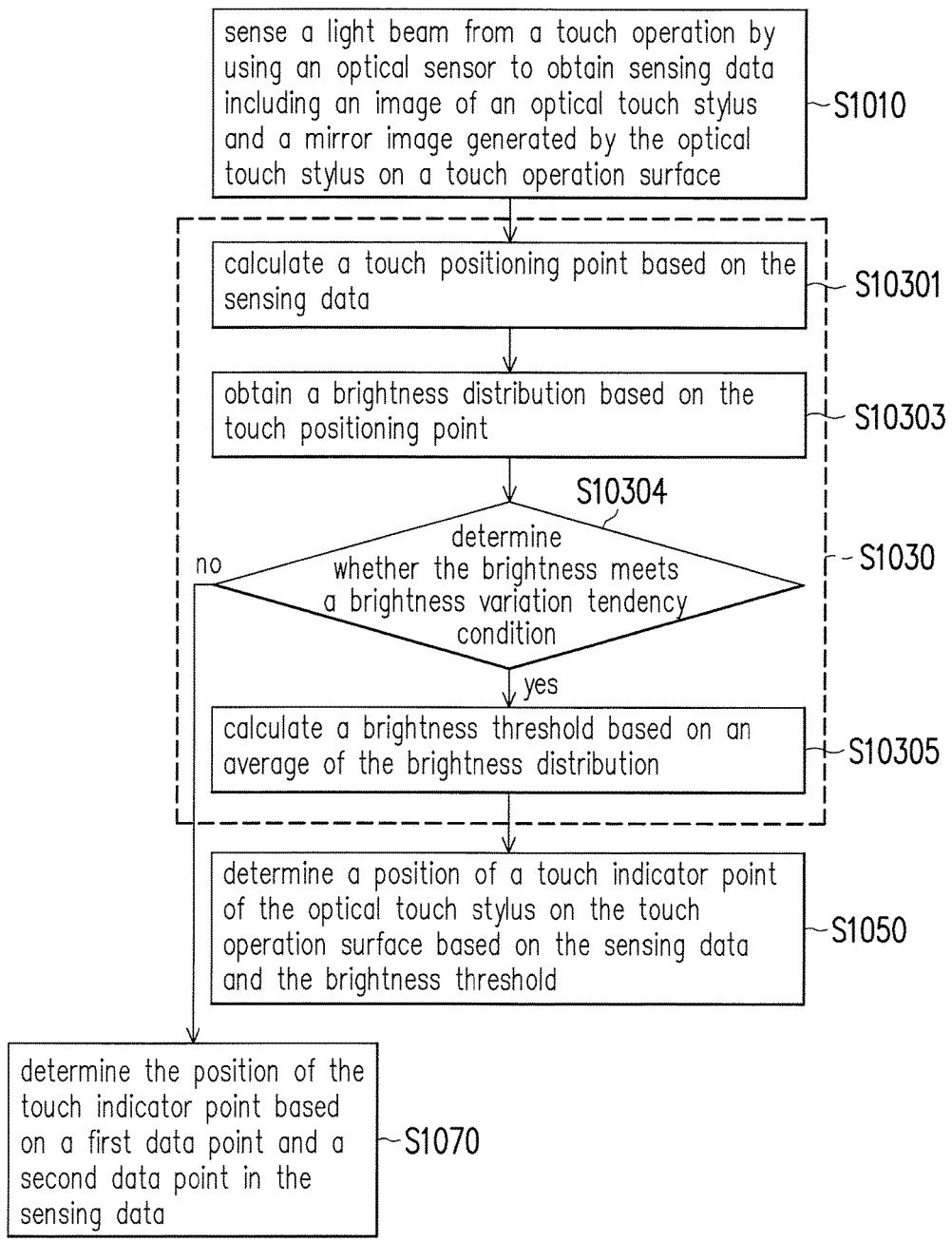
FIG. 10 is a flowchart illustrating a method for determining a position of a touch indicator point according to another embodiment of the invention.
Figure 11A:
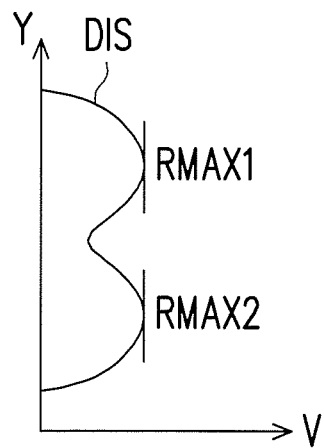
FIGS. 11A and 11B are schematic views illustrating the method for determining the position of the touch indicator point according to the embodiment of FIG. 10.
Figure 11B:
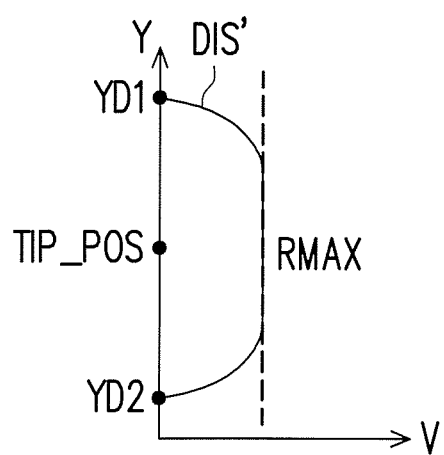

FIG. 10 is a flowchart illustrating a method for determining a position of a touch indicator point according to another embodiment of the invention. FIGS. 11A and 11B are schematic views illustrating the method for determining the position of the touch indicator point according to the embodiment of FIG. 10. Referring to FIG. 10, in this embodiment, Steps S1010, S1030, S10301, S10303, S10305, and S1050 are respectively similar to Steps S310, S330, S3301, S3303, S3305, and S350. Thus, details in these respects will not be repeated in the following. The difference between this embodiment and the previous embodiment lies in that, at Step S3303 of the previous embodiment, the process proceeds to Step S3305 to calculate the brightness threshold after the touch controller 250 obtains the brightness distribution based on the touch positioning point Lx and according to the sensing data 400. However, in this embodiment, after the touch controller 250 obtains the brightness distribution DIS at Step S10303, the process proceeds to Step S10304 to determine whether the obtained brightness distribution DIS meets a brightness variation tendency condition. In this embodiment, the brightness variation tendency condition includes that the brightness distribution DIS includes at least two relative maximum values. If the touch controller 250 determines that the obtained brightness distribution DIS meets the brightness variation tendency condition, the process proceeds to Step S10305 to calculate the brightness threshold. Alternatively, if the touch controller 250 determines that the obtained brightness distribution DIS does not meet the brightness variation tendency condition, the process does not proceed to Step S10305 but proceeds to Step S1070 to obtain the position of the touch indicator point.

Taking FIG. 11A as an example, in this embodiment, the brightness distribution DIS of the sensing data obtained by the optical sensor 230 has two relative maximum values RMAX1 and RMAX2. Thus, at Step S10304, the touch controller 250 determines whether the brightness distribution DIS meets the brightness variation tendency condition, so as to proceed to Step S10305 to calculate the brightness threshold BTH. It should be noted that, in this embodiment, Step S10305 is similar to Step S3305 in the embodiment of FIG. 3, where the average AVG of the brightness distribution DIS is used as the brightness threshold BTH. In another embodiment, Step S10305 may also be similar to Step S8305 in the embodiment of FIG. 8 including Steps S83051 to S83055 and using the threshold adjustment coefficient n to adjust the brightness threshold BTH based on the average AVG. In other words, the process of determining the brightness variation tendency in this embodiment does not affect the embodiment of calculating the brightness threshold by using the average of the brightness distribution DIS at Step 10305.

Taking FIG. 11B as an example, in this embodiment, a brightness distribution DIS' of the sensing data obtained by the optical sensor 230 has only one relative maximum value RMAX1. Therefore, at Step S10304, the touch controller 250 may determine that the brightness distribution DIS' does not meet the brightness variation tendency condition. The process thus proceeds to Step S1070 to obtain the position of the touch indicator point. At Step S1070, the touch controller 250 determines the position of the touch indicator point based on a first data point and a second data point in the sensing data obtained by the optical sensor 230. In other words, if the touch controller 250 determines that the brightness distribution DIS' does not meet the brightness variation tendency condition, the touch controller 250 may determine the position of the touch indicator point in a specific way based on two data points in the sensing data. In this embodiment, the touch controller 250 may obtain the uppermost and lowermost data points in the corresponding target data points of the brightness distribution DIS' as the first data point and the second data point. Then, the touch controller 250 may use a middle value between a Y coordinate value YD1 of the first data point and a Y coordinate value YD2 of the second data point as the position TIP_POS of the touch indicator point. Namely, TIP_POS=0.5×(YD1+YD2). However, in another embodiment, the touch controller 250 may also adopt another way to determine the position of the touch indicator point based on the first data point and the second data point. For example, a position at ⅓ of the distance between the Y coordinate value YD1 and the Y coordinate value YD2 and closer to the Y coordinate value YD2 may be used as the position TIP_POS of the touch indicator point. Namely, TIP_POS=0.33×(YD1+YD2). Further to the above, in response to different circumstances, the user may also use the touch controller 250 to set a specific way of determining the position of the touch indicator point based on the first data point and the second data point. The invention does not intend to impose a limitation in this regard.

Accordingly, by adding the step of determining the brightness variation tendency condition in this embodiment and using different ways of determining the position of the touch indicator point based on the result of determination, the position of the touch indicator point is able to be accurately determined under a special circumstance such as brightness saturation.

In view of the foregoing, in the optical touch apparatus, the method for determining the touch indicator point, and the optical touch system according to the embodiments of the invention, the touch controller uses the sensing data sensed by the optical sensor to calculate the brightness threshold, and determines the position of the touch indicator point based on the sensing data and the brightness threshold. Accordingly, the image of the optical touch stylus and the mirror image generated by the optical touch stylus on the touch operation surface in the sensing data are able to be distinguished by using the brightness distribution of the sensing data, and the position of the touch indicator point is able to be accurately calculated. In addition, based on factors such as the relative positions between the optical touch stylus and the optical sensor and the size of the touch operation surface, the brightness threshold is further adjusted by using the threshold adjustment coefficient in the embodiments of the invention, so as to further increase the accuracy of determination. Besides, in the embodiments of the invention, the way of determining special circumstances such as brightness saturation and the corresponding method for determining the touch indicator point are provided. Thus, under most circumstances, the position of the touch indicator point is able to be correctly calculated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch apparatus, adapted to sense a touch operation of an optical touch stylus capable of reflecting or emitting a light beam, the optical touch apparatus comprising:
   a touch operation surface, wherein the optical touch stylus performs the touch operation on the touch operation surface;
   an optical sensor, disposed at a side of the touch operation surface and adapted to sense the light beam from the touch operation to obtain sensing data; and
   a touch controller, electrically connected to the optical sensor, adapted to calculate a brightness threshold based on the sensing data and determine a position of a touch indicator point of the optical touch stylus on the touch operation surface based on the sensing data and the brightness threshold,
   wherein the sensing data comprise an image of the optical touch stylus and a mirror image generated by the optical touch stylus on the touch operation surface,
   wherein the touch controller calculates a touch positioning point based on the sensing data, obtains a brightness distribution based on the touch positioning point and according to the sensing data, and calculates the brightness threshold by using an average of the brightness distribution,
   wherein the touch controller further adjusts the brightness threshold based on the average of the brightness distribution by using a threshold adjustment coefficient,
   wherein the touch controller further determines whether an adjusted brightness threshold meets a threshold correction condition based on a plurality of relative extreme values of the brightness distribution and the adjusted brightness threshold, and
   if the touch controller determines that the adjusted brightness threshold meets the threshold correction condition, the relative extreme values of the brightness distribution are used to re-calculate the brightness threshold.

2. The optical touch apparatus as claimed in claim 1, wherein the threshold adjustment coefficient is associated with a size of the touch operation surface.

3. The optical touch apparatus as claimed in claim 1, wherein the touch controller further determines whether the brightness distribution meets a brightness variation tendency condition, and if the brightness distribution does not meet the brightness variation tendency condition, the position of the touch indicator point is determined based on a first data point and a second data point in the sensing data.

4. The optical touch apparatus as claimed in claim 3, wherein the brightness variation tendency condition comprises that the brightness distribution has at least two relative maximum values.

5. The optical touch apparatus as claimed in claim 1, further comprising:
   a light emitting device, disposed at the side of the touch operation surface and adjacent to the optical sensor and adapted to emit the light beam, such that the optical touch stylus reflects the light beam.

6. The optical touch apparatus as claimed in claim 1, wherein the touch operation surface is a surface of one of a display, a television, an advertisement billboard, and an electronic whiteboard.

7. A method for determining a position of a touch indicator point, adapted to determine a position of a touch indicator point of an optical touch stylus capable of emitting or reflecting a light beam when the optical touch stylus performs a touch operation on a touch operation surface, the method comprising:

sensing the light beam from the touch operation by using an optical sensor, so as to obtain sensing data;

calculating a brightness threshold based on the sensing data; and determining the position of the touch indicator point of the optical touch stylus on the touch operation surface based on the sensing data and the brightness threshold, wherein the sensing data comprise an image of the optical touch stylus and a mirror image generated by the optical touch stylus on the touch operation surface, wherein the step of calculating the brightness threshold based on the sensing data comprises:

calculating a touch positioning point based on the sensing data;

obtaining a brightness distribution based on the touch positioning pint and according to the sensing data; and calculating the brightness threshold based on an average of the brightness distribution, wherein the step of calculating the brightness threshold based on the average of the brightness distribution comprises:

adjusting the brightness threshold based on the average of the brightness distribution by using a threshold adjustment coefficient, wherein the step of calculating the brightness threshold based on the average of the brightness distribution further comprises:

determining whether an adjusted brightness threshold meets a threshold correction condition based on a plurality of relative extreme values of the brightness distribution and the adjusted brightness threshold; and re-calculating the brightness threshold by using the relative extreme values of the brightness distribution if it is determined that the adjusted brightness threshold meets the threshold correction condition.

8. The method for determining the position of the touch indicator point as claimed in claim 7, wherein the threshold adjustment coefficient is associated with a size of the touch operation surface.

9. The method for determining the position of the touch indicator point as claimed in claim 7, wherein the step of calculating the brightness threshold based on the sensing data further comprises:

determining whether the brightness distribution meets a brightness variation tendency condition; and determining the position of the touch indicator point based on a first data point and a second data point in the sensing data if the brightness distribution does not meet the brightness variation tendency condition.

10. The method for determining the position of the touch indicator point as claimed in claim 9, wherein the brightness variation tendency condition comprises that the brightness distribution has at least two relative maximum values.

11. The method for determining the position of the touch indicator point as claimed in claim 7, wherein the touch operation surface is a surface of one of a display, a television, an advertisement billboard, and an electronic whiteboard.

12. An optical touch system comprising:

an optical touch stylus, adapted to perform a touch operation and capable of emitting or reflecting a light beam; and an optical touch apparatus, comprising:

a touch operation surface, wherein the optical touch stylus performs the touch operation on the touch operation surface;

an optical sensor, disposed at a side of the touch operation surface and adapted to sense the light beam from the touch operation to obtain sensing data; and a touch controller, electrically connected to the optical sensor, adapted to calculate a brightness threshold based on the sensing data, and determining a position of a touch indicator point of the optical touch stylus on the touch operation surface based on the sensing data and the brightness threshold, wherein the sensing data comprise an image of the optical touch stylus and a mirror image generated by the optical touch stylus on the touch operation surface, wherein the touch controller calculates a touch positioning point based on the sensing data, obtains a brightness distribution based on the touch positioning point and according to the sensing data, and calculates the brightness threshold by using an average of the brightness distribution, wherein the touch controller further adjusts the brightness threshold based on the average of the brightness distribution by using a threshold adjustment coefficient, wherein the touch controller further determines whether an adjusted brightness threshold meets a threshold correction condition based on a plurality of relative extreme values of the brightness distribution and the adjusted brightness threshold, and if the touch controller determines that the adjusted brightness threshold meets the threshold correction condition, the relative extreme values of the brightness distribution are used to re-calculate the brightness threshold.

* * * * *